(12) United States Patent
Hoover et al.

(10) Patent No.: US 6,929,113 B1
(45) Date of Patent: Aug. 16, 2005

(54) TELESCOPING STACKING CONVEYOR HAVING A SINGLE CONVEYOR BELT AND SINGLE DRIVE MECHANISM FOR THE BELT

(75) Inventors: Jerell D. Hoover, Fort Hill, PA (US); Shawn M. Hoover, Mayfield, KY (US)

(73) Assignee: Hoover Conveyor & Fabrication Corp., Meyersdale, PA (US)

( * ) Notice: Subject to any disclaimer, the term of this patent is extended or adjusted under 35 U.S.C. 154(b) by 0 days.

(21) Appl. No.: 10/802,484

(22) Filed: Mar. 17, 2004

(51) Int. Cl.[7] ............................................. B65G 21/14
(52) U.S. Cl. ..................... 198/812; 198/313; 198/588; 198/594
(58) Field of Search ............................... 198/812, 588, 198/594, 313; 212/348–350

(56) References Cited

U.S. PATENT DOCUMENTS

| | | | |
|---|---|---|---|
| 2,263,506 A | * | 11/1941 | Skelding ..................... 198/812 |
| 3,825,107 A | * | 7/1974 | Cary et al. ................... 198/313 |
| 3,826,353 A | * | 7/1974 | Greasley ...................... 198/313 |
| 3,945,484 A | * | 3/1976 | Oury ............................ 198/313 |
| 4,135,614 A | | 1/1979 | Penterman et al. |
| 4,427,104 A | | 1/1984 | Reid, Jr. |
| 5,203,442 A | * | 4/1993 | Oury et al. .................. 198/313 |
| 5,390,777 A | | 2/1995 | Gage |
| 5,515,961 A | | 5/1996 | Murphy et al. |
| 5,833,043 A | | 11/1998 | Schmidgall et al. |
| 6,056,252 A | | 5/2000 | Johannsen |
| 6,360,876 B1 | | 3/2002 | Nohl et al. |

* cited by examiner

Primary Examiner—Eileen D. Lillis
Assistant Examiner—Mark A. Deuble
(74) Attorney, Agent, or Firm—William F. Lang, IV; Eckert Seamans Cherin & Mellott, LLC

(57) ABSTRACT

A portable radially stacking conveyor has a telescoping stinger, with the stinger and main section sharing a single conveyor belt having a single drive mechanism.

18 Claims, 9 Drawing Sheets

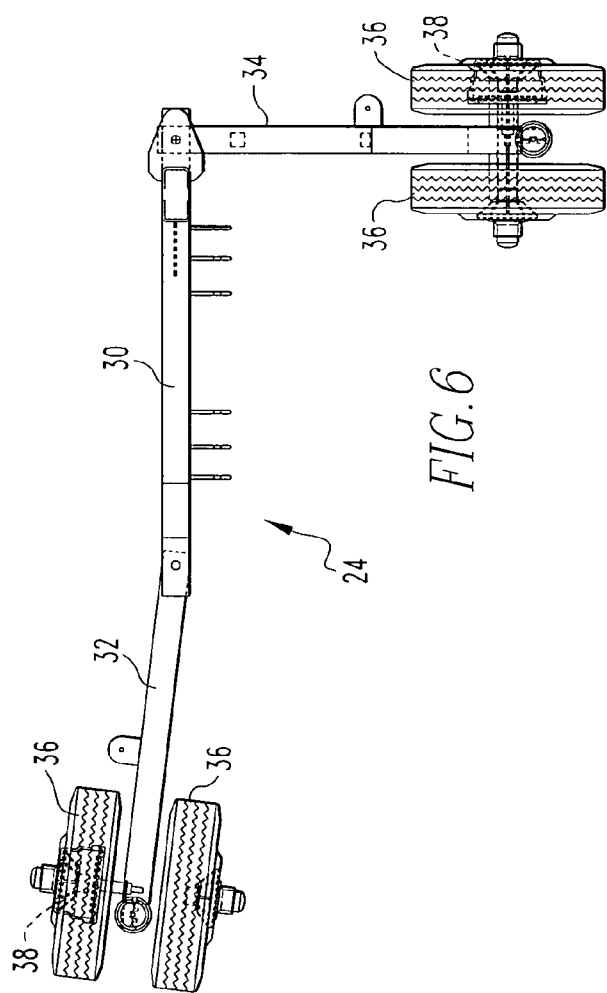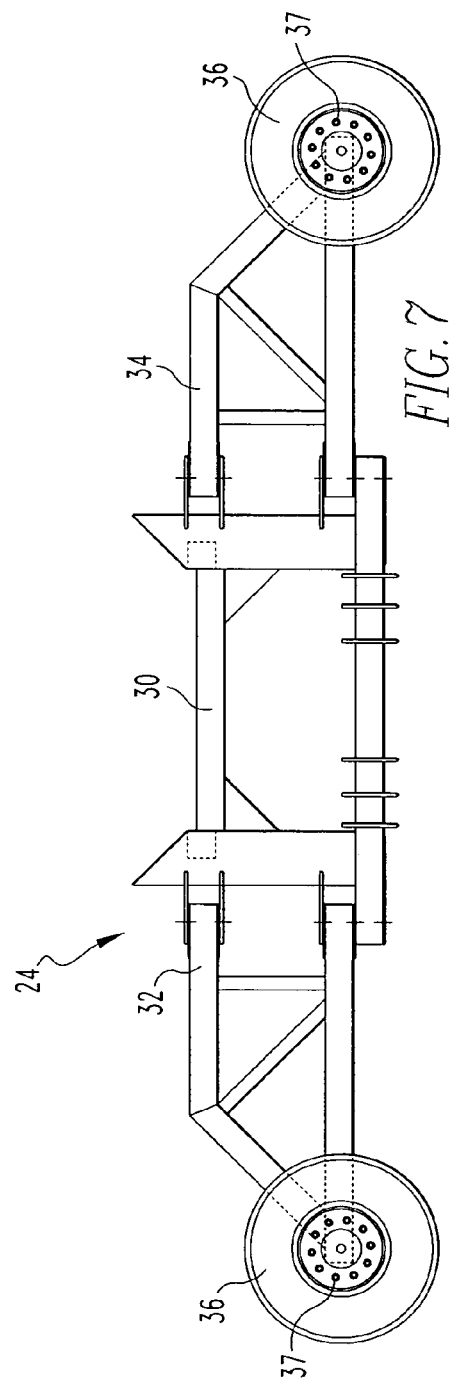

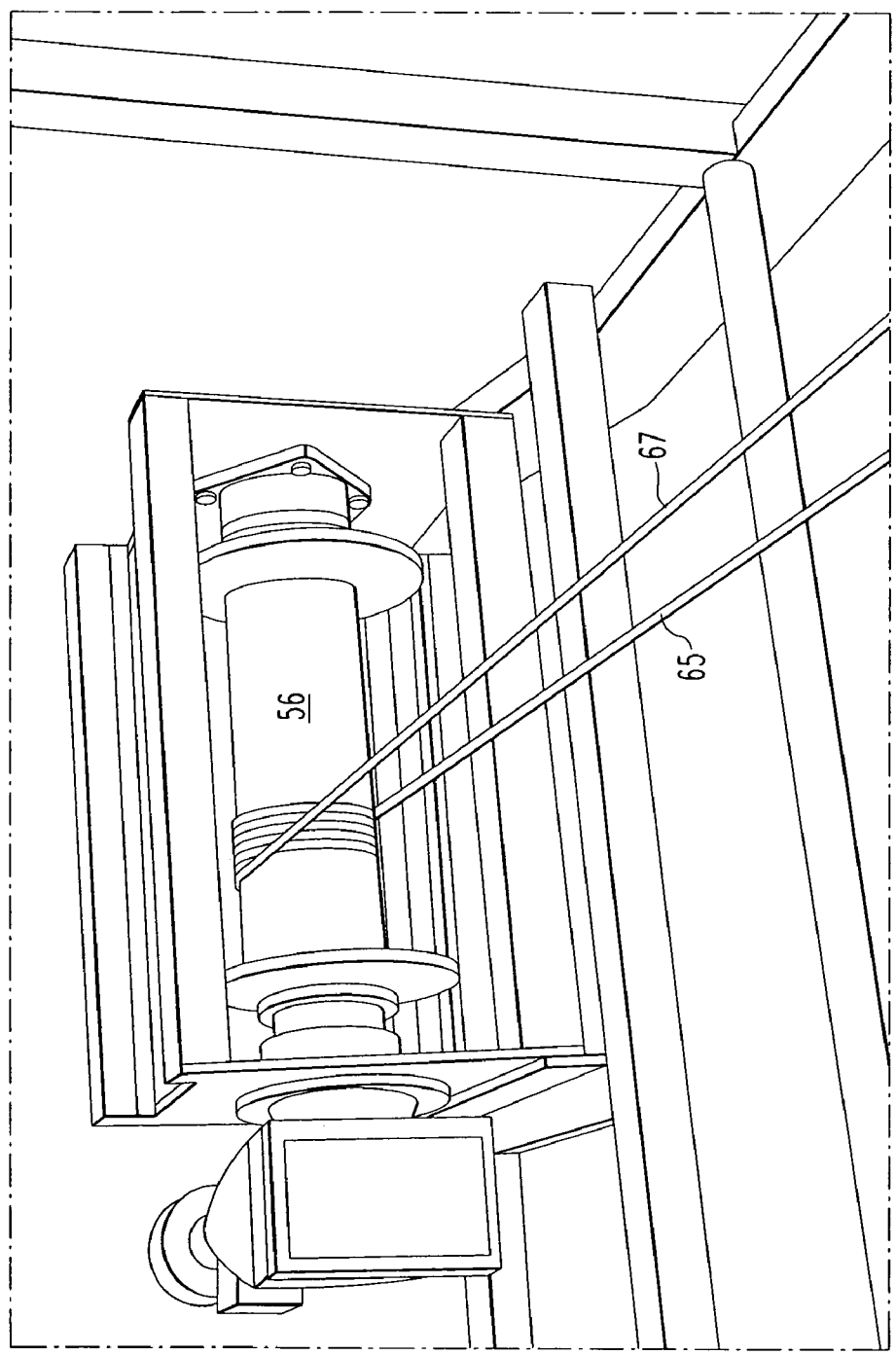

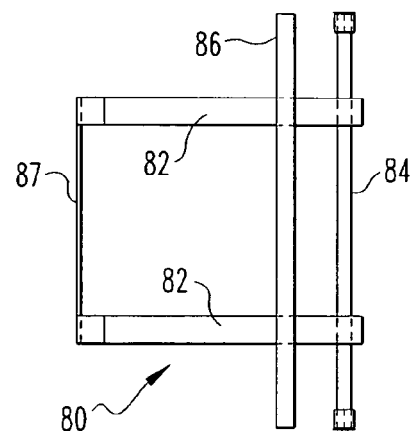
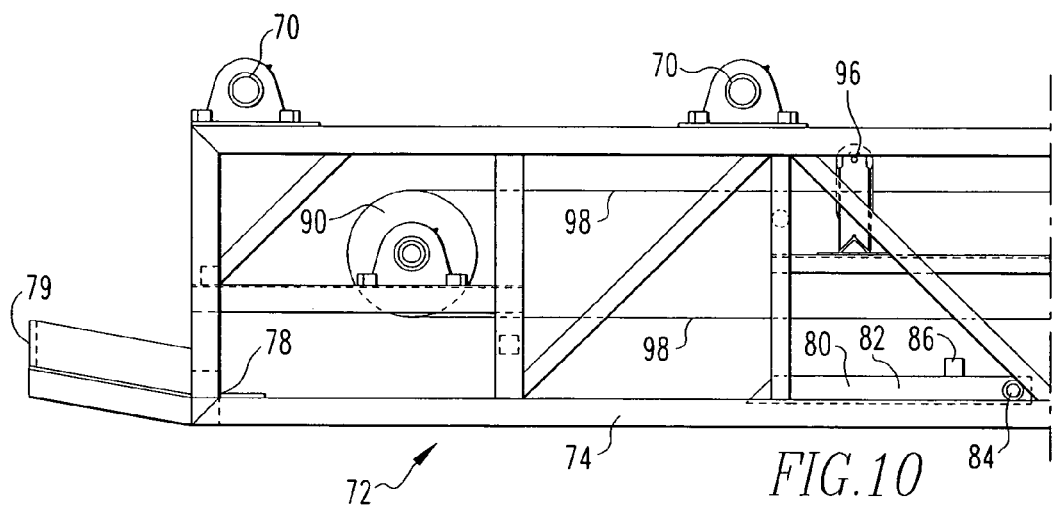
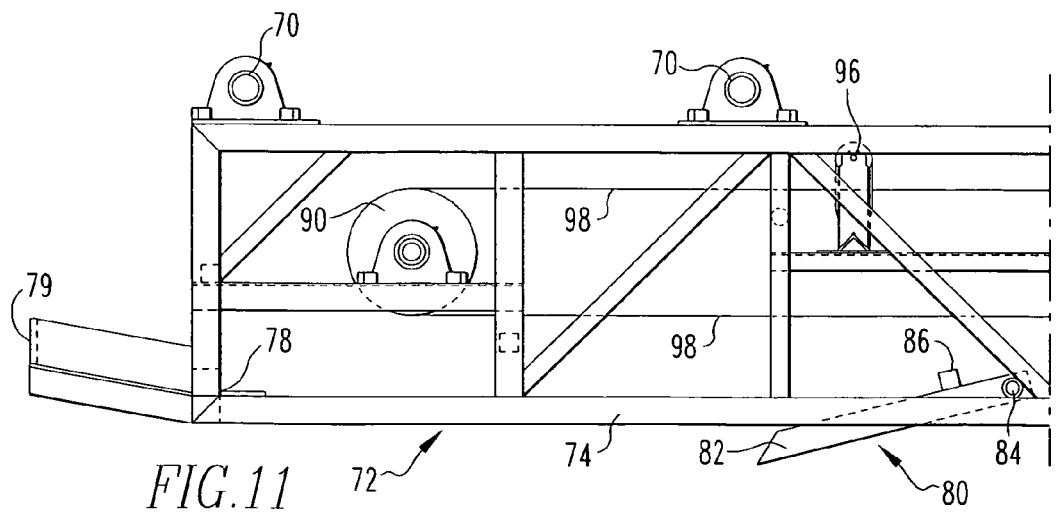

TELESCOPING STACKING CONVEYOR HAVING A SINGLE CONVEYOR BELT AND SINGLE DRIVE MECHANISM FOR THE BELT

BACKGROUND OF THE INVENTION

1. Field of the Invention

The present invention relates to telescoping stacking conveyors. More specifically, the invention provides a telescoping radial stacking conveyor having a single conveyor belt, operated by a single drive mechanism.

2. Description of the Related Art

Radial stacking conveyors are typically used to transport material into stockpiles, storage bins, or other storage locations. Portable radial stacking conveyors are presently designed so that they include folding ends to shorten the length of the stacker for transportation, or are telescoping for the same reason. They typically include a conveyor frame or boom driven by an undercarriage having a wheel assembly. The conveyor includes means for raising and lowering the boom, and means for pivoting the boom about the tail end of the conveyor.

An example of a portable radial stacker is disclosed in U.S. Pat. No. 4,135,614, issued to L. F. Penterman et al. on Jan. 23, 1979. The stacker includes an axle assembly having a transverse member secured to the end of the supporting structure of the stacker. A torsion lever is pivotally secured to each end of the transverse member, and has a pair of tires, with each tire having an independent suspension mounting at its other end. The torsion levers may be pivoted from a position wherein they are aligned with the transverse member, to a position wherein they are substantially perpendicular to the transverse member.

U.S. Pat. No. 4,427,104, issued to E. W. Reid, Jr. on Jan. 24, 1984, discloses a folding radial stacker. The stacker includes a central portion and a pair of end portions. Each end portion is pivotally secured to one end of the central portion. An A-shaped frame is pivotally secured at the hinge between each end portion and the central portion. At each end, the hydraulic ram extends from the central portion to the A-shaped portion, and from the A-shaped portion to the end portion.

U.S. Pat. No. 5,390,777, issued to P. G. Gage on Feb. 21, 1995, discloses a constant pivot mechanism for variable height radial stacking conveyors. The mechanism includes a curved channel through which the top of the rear push arm travels as the conveyor is raised and lowered.

U.S. Pat. No. 5,515,961, issued to R. B. Murphy et al. on May 14, 1996, discloses a portable radial stacking conveyor. The stacker uses hydraulic fold-down outriggers having radial travel wheels at their ends. When the outriggers are lowered, the transport wheels are raised. A similar radial stacker is described in U.S. Pat. No. 5,833,043, issued to P. Schmidgall et al. on Nov. 10, 1998.

U.S. Pat. No. 6,056,252, issued to T. J. Johannsen on May 2, 2000, discloses a support assembly for a telescopic conveyor system. The support assembly includes a pivot plate connected to the base frame, and including first and second bearing plates, each pivotally secured to the pivot plate. Each of the bearing plates is located on opposite sides of the pivot plate. The support rollers support the extendable frame, thereby facilitating extension and retraction of the extendable frame, with the weight of the extendable frame proportionally distributed over all of the support rollers. Both the base frame and extendable frame include a conveyor belt.

U.S. Pat. No. 6,360,876, issued to J. D. Nohl et al. on Mar. 26, 2002, discloses a portable telescoping radial stacking conveyor. The conveyor includes a base and extendable portion, called a stinger, each of which has its own conveyor belt with its own drive mechanism. A winch mechanism is used to extend and retract the stinger from the base. The base includes transport wheels and a pair of outriggers having radial wheels. During transportation, the outriggers are raised so that the base rests on the transport wheels. During use, the outriggers are lowered, raising the transport wheels off the ground, and permitting the conveyor to pivot around one end of the base. Extension and retraction of the stinger, and radial movement of the conveyor, may be accomplished manually or by an automatic control system during a stacking operation.

Telescoping conveyors have the advantage of stacking material at any desired distance from the base within the minimum retracted and maximum extended position of the stinger. Fixed length or folding conveyors may only deposit material at a single, fixed distance from the base. However, telescoping conveyors typically include a pair of conveyor belts, with one conveyor being located on the base, and the other being located on the stinger, and with each conveyor having a separate drive mechanism. It is therefore necessary to maintain two separate drive mechanisms. The drive mechanism of the stinger is often located at the terminal end of the stinger, increasing the difficulty of servicing this mechanism. This location is often required, because the terminal end of the stinger is the only part accessible through the main frame with the stinger retracted. Accordingly, it is desirable to provide a telescoping portable radial stacking conveyor having a single conveyor belt, operated by a single drive mechanism.

SUMMARY OF THE INVENTION

The present invention provides a portable radial stacking conveyor having a main section and a telescoping stinger. The base and telescoping stinger share a single conveyor belt, having a single drive mechanism.

The main section sits on a base, including an elongated frame extending partway along and underneath the main section. The base has a tail end having a support, and a head end with a pair of pivoting arms, with each pivoting arm having a pair of wheels at its end. The wheels of each arm include a drive mechanism capable of driving the wheels in either direction. The base also includes means for securing to a truck for transportation, located adjacent to the support. The arms may be pivoted from a position wherein they are parallel to the main section for transportation, or in a radial position to the main section for the radial pivoting of the stacker. A hydraulic arm extends from the head end of the base with the wheels to the head end of the main section, for raising and lowering the main section.

The extendable section, or stinger, sits within the main section, and is supported within the main section by rollers attached to the head end of the main section and lower end of the stinger. The stinger is extended and retracted by a winch located at the tail end of the main section, with an extension cable extending to a pulley at the head end of the main section, and back to the lower end of the stinger, and a retraction cable extending from the winch to the stinger.

The main section and stinger section share a single conveyor, having a single drive mechanism. The drive mechanism is located at the tail end of the main section. From the drive pulley, the conveyor belt extends to the lower-most portion of the main section, wrapping around a pulley and extending across a series of rollers to a pulley at the head end of the main section. After wrapping around this pulley, the conveyor belt passes underneath itself to wrap around a second pulley located a short distance away from the head end of the main section, but within the head end portion of the main section. The conveyor belt next extends across a series of rollers on the stinger, wrapping around a pulley at the terminal end of the stinger before returning underneath itself to wrap around a pulley at the lower end of the stinger. From here, the conveyor belt passes over itself back to another pulley within the main section, located within the head end portion, before returning to the trans pulley and drive pulley. With the belt arranged in this manner, that portion of the belt within the stinger is divided by the two pulleys within the end portion of the main section. When the stinger is retracted, a short portion of the belt is located between these pulleys and the stinger's terminal end, and a long portion of the belt is located between these pulleys and the stinger's lower end. Likewise, when the stinger is extended, the portion of the belt between these pulleys and the stinger's lower end shortens as the portion between the stinger's terminal end and these pulleys lengthens. The belt therefore remains in constant tension and operable regardless of the position of the stinger.

The various control mechanisms of the conveyor may be manually operated by standard electrical switching, which is well-known to those skilled in the art. Alternatively, the control mechanisms may be operated using a programmable logic controller, which is also well-known to those skilled in the art.

The present invention therefore provides a portable radially stacking conveyor having a telescoping stinger and a single conveyor belt, operated by a single drive mechanism. The conveyor may be retracted and lowered for transportation by a truck, and raised by the hydraulic arm to the desired height once at the job site. The stacking conveyor may be operated with the stinger in any degree of extension or retraction, or the stinger may be extended or retracted during a stacking operation. The conveyor may further be pivoted about the main section's support during a stacking operation. The conveyor of the present invention therefore provides maximum flexibility in stacking operations while also providing simplified maintenance.

It is therefore an object of the present invention to provide a portable radial stacking conveyor having a single conveyor belt having a single drive means.

It is another object of the invention to provide a portable radial stacking conveyor wherein the single conveyor belt remains at the proper tension and operable regardless of the degree of extension or retraction of the stinger.

It is a further object of the invention to provide a portable radial stacking conveyor wherein the drive means for the single conveyor belt is located where it will facilitate servicing.

These and other objects of the invention will be more fully understood by reference to the drawings and description below.

BRIEF DESCRIPTION OF THE DRAWINGS

FIG. 6 is a top view of a wheel assembly for a portable radial stacking conveyor according to the present invention.

FIG. 7 is a front view of a wheel assembly for a portable radial stacking conveyor according to the present invention.

FIG. 8 is a front view of a winch for a portable radial stacking conveyor according to the present invention.

FIG. 9 is a top view of a safety brake for a portable radial stacking conveyor according to the present invention.

FIG. 10 is a side view of safety brake for a portable radial stacking conveyor according to the present invention, showing the safety brake in its usual position.

FIG. 11 is a side view of safety brake for a portable radial stacking conveyor according to the present invention, showing the safety brake in its actuated position.

Like reference numbers denote like elements throughout the drawings.

DETAILED DESCRIPTION OF THE PREFERRED EMBODIMENTS

The present invention provides a portable radial stacking conveyor having a single conveyor, with a single drive mechanism, extending through both the main and stinger sections.

Figure 1:
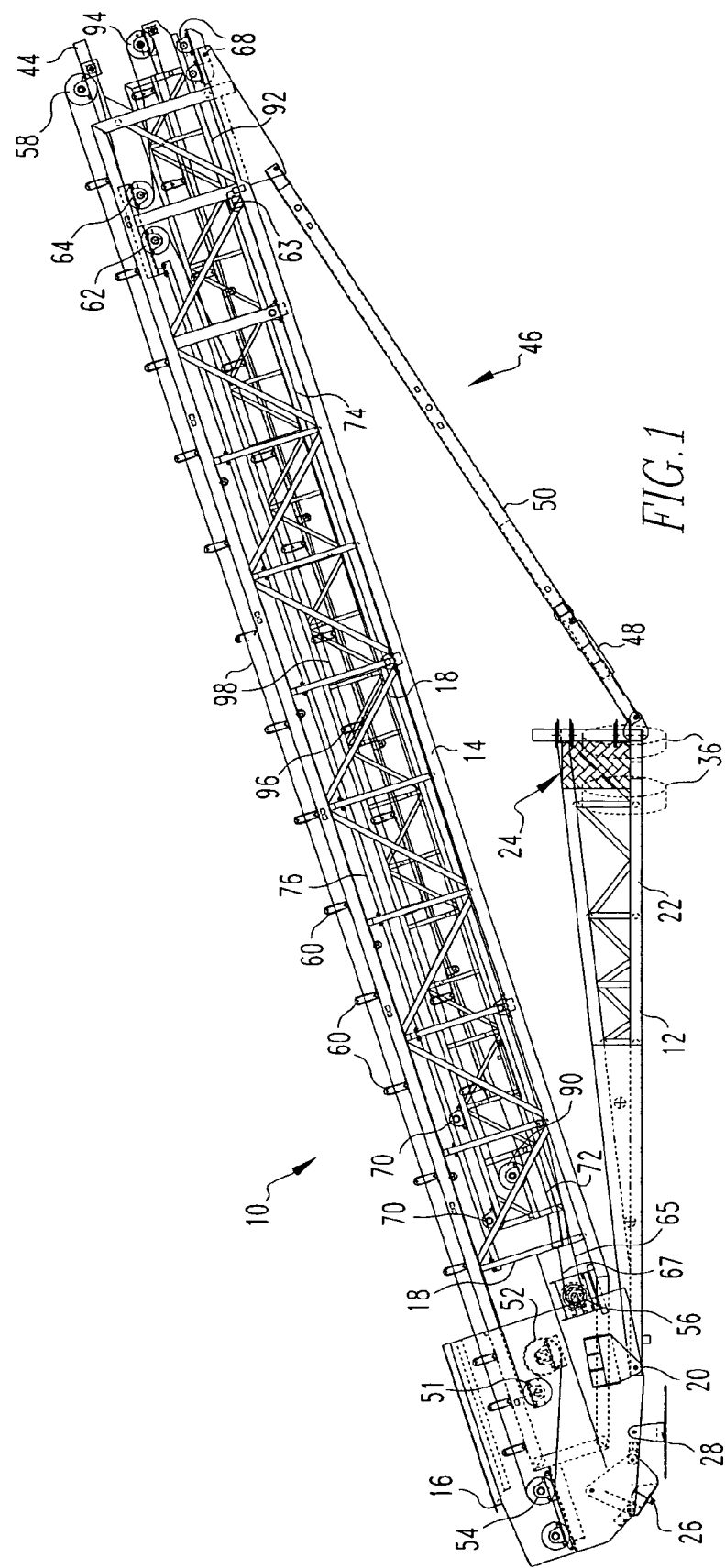
FIG. 1 is a side view of a portable radial stacking conveyor according to the present invention, showing the stinger in its retracted position.
Figure 2:
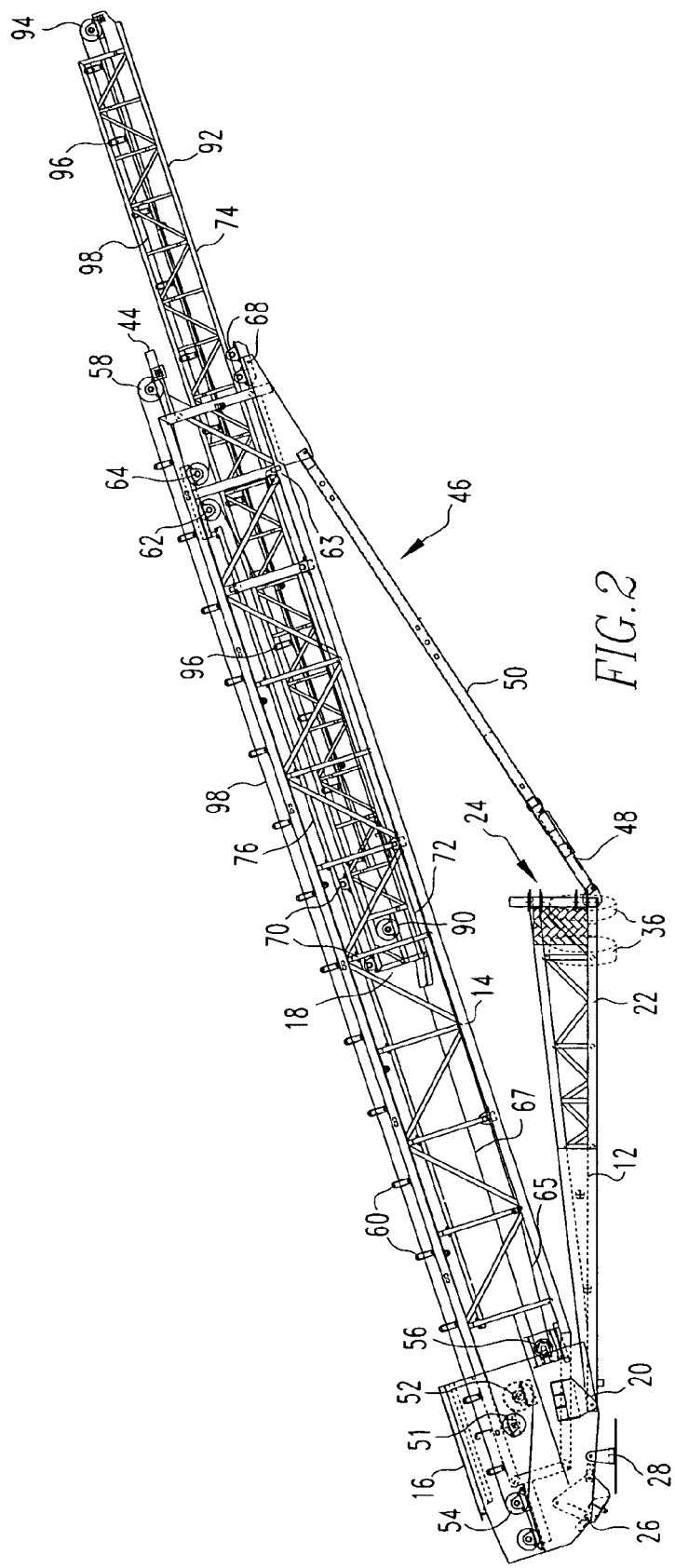
FIG. 2 is a side view of a portable radial stacking conveyor according to the present invention, showing the stinger halfway between its extended and retracted positions.
Figure 3:
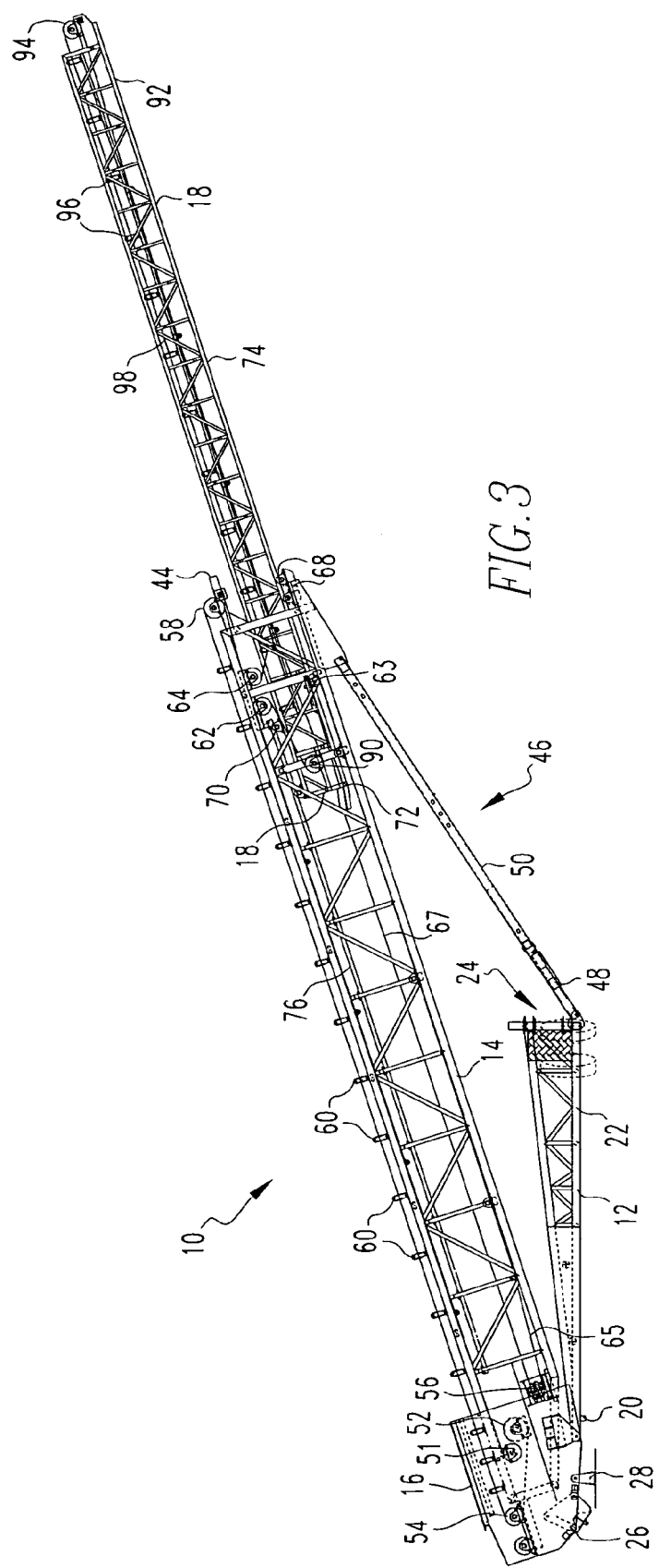
FIG. 3 is a side view of a portable radial stacking conveyor according to the present invention, showing the stinger in its extended position.
Figure 4:
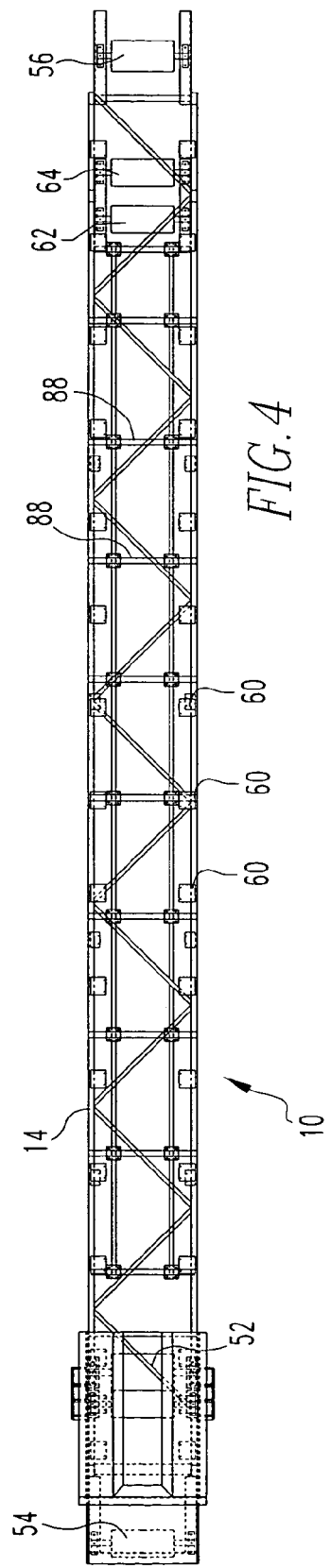
FIG. 4 is a top view of a main section of a portable radial stacking conveyor according to the present invention.

Referring to FIGS. 1–3, the conveyor 10 includes a base 12, a main section 14, pivotally secured at its tail end 16 to the base 12, and a stinger section 18.

Figure 5:
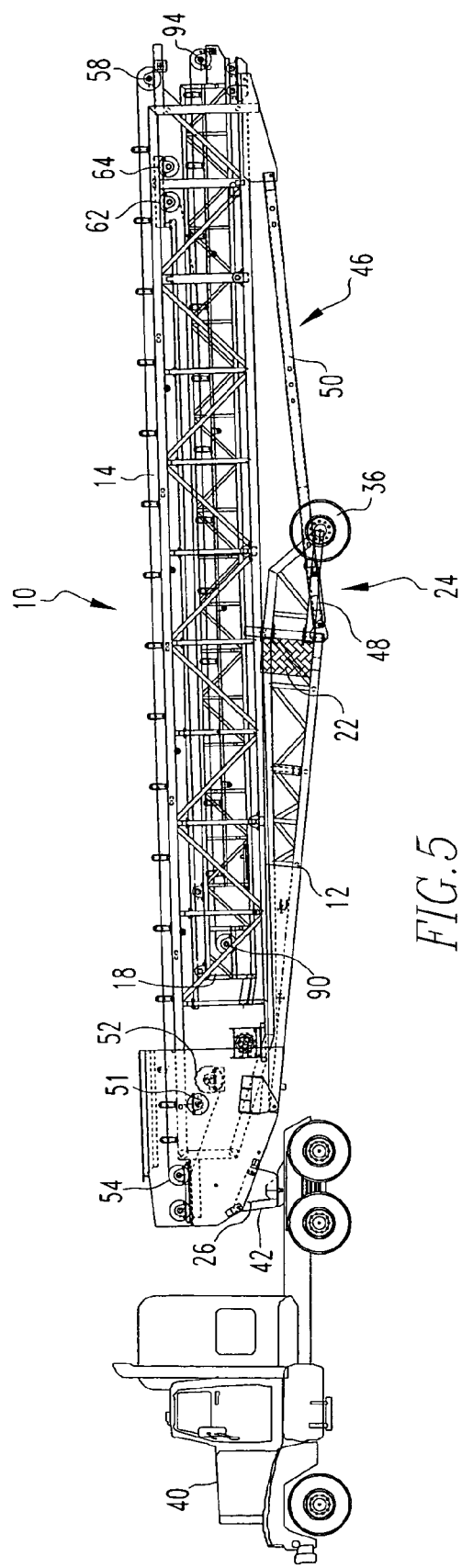
FIG. 5 is a side view of a portable radial stacking conveyor according to the present invention, showing the conveyor configured for transport.

The base 12 includes a tail end 20 to which the main section 14 is pivotally secured, and a head end 22 to which a wheel assembly 24 is secured. The tail end 20 includes a hitch 26 for securing the conveyor 10 to a truck, and a support 28 structured to support the tail end 20 when the conveyor 10 is in use. Referring briefly to FIGS. 6 and 7, the wheel assembly 24 includes a central frame 30, for securing to the head end 22 of the base 12, and a pair of pivotally secured arms 32, 34 extending from either side of the central section 30. Each of the arms 32, 34 includes at least one, and preferably a pair, of wheels 36. At least one wheel 36 on each arm includes a drive mechanism to rotate the wheels in either direction to rotate the base 12. The drive mechanism is well known to those skilled in the art and is therefore not described or shown in great detail, but generally comprises a motor-driven chain drive system, with the chain driving the sprocket 38 on the wheel 36. The arms 32, 34 may be pivoted to lie parallel to the base 12 for transport, for example, the arm 34 in FIG. 6, or in a radial position with respect to the base 12 for rotation of the conveyor 10, for example, the arm 32 in FIG. 6. A hydraulic lift is provided at the end 22 of the base 12 to lift the end 22 sufficiently to permit pivoting of the arms 32,34. Such hydraulic lifts are well-known and therefore not further described herein. As is well known to those skilled in the art, the arms 32,34 are secured in the desired position by a pin passing through the arm and the central frame 30. Additionally, as is well known in the art, the wheels 36 may be substantially prevented from rotating when desired by inserting a pin through an aperture 37, and permitted to rotate by removing the pins. The conveyor 10 may be transported by the truck 40, as illustrated in FIG. 5, by securing the hitch 26 to the corresponding hitch 42 on the truck 40.

Figure 12:
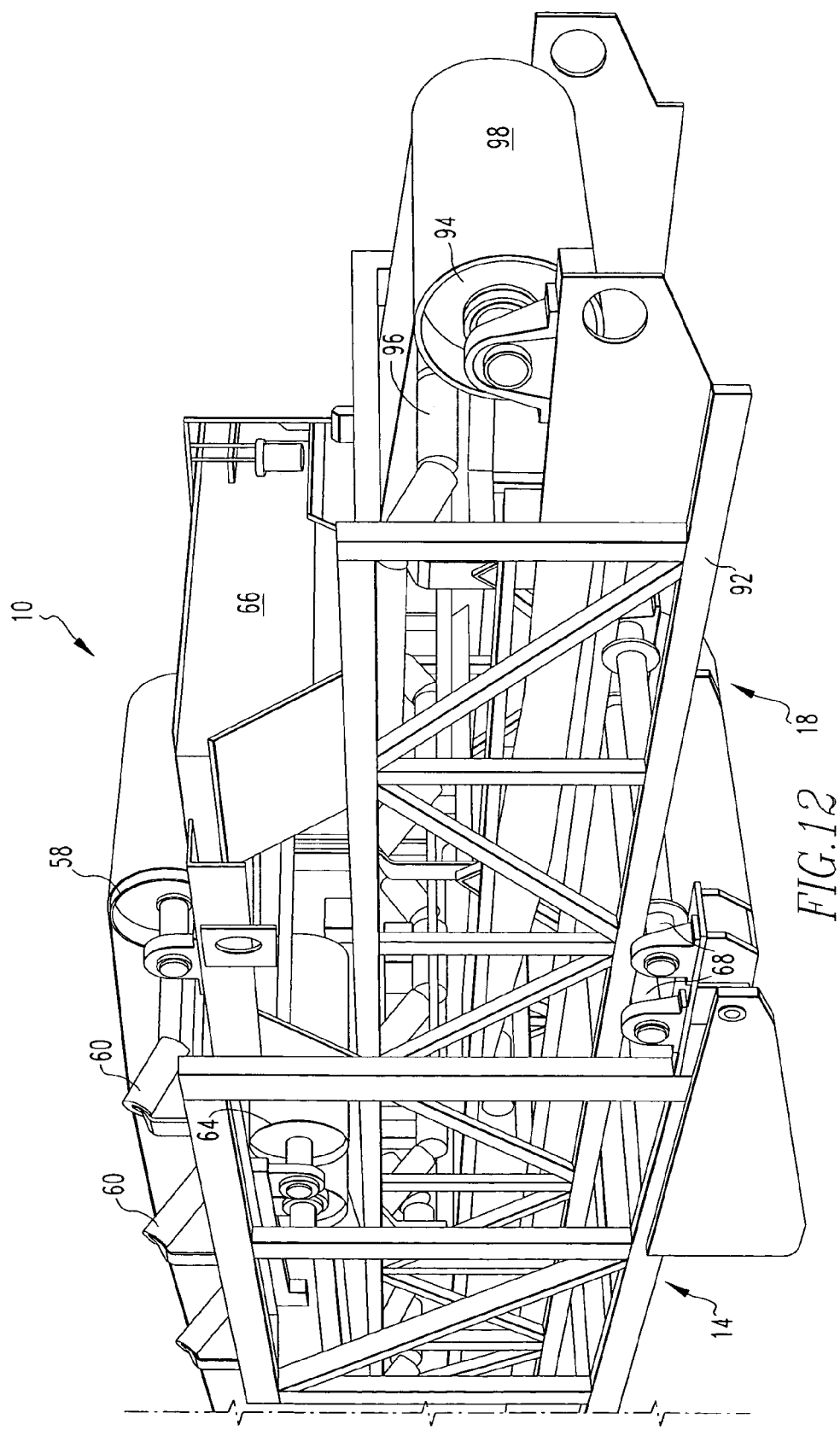
FIG. 12 is a side isometric view of a terminal end of a portable radial stacking conveyor according to the present invention.

Referring back to FIGS. 1–4, the main section 14 includes a tail end 16 and a head end 44. The head end 44 is connected to the head end 22 of the base 12 by a lifting mechanism 46. The lifting mechanism 46 includes a means for raising and lowering the head end 44, which in the illustrated embodiment includes a hydraulic cylinder 48 connected at one end to the head end 22 of the base 12, and at its second end to a strut 50. The strut 50 is connected at its opposite end to the head end 44, so that extension of the hydraulic cylinder 48 will raise the main section 14, and retraction of the hydraulic cylinder 48 will lower the main section 14. A hydraulic reservoir and motor are located at the tail end 20 of the base 12, and are operatively connected with the hydraulic cylinder 48. The hydraulic motor is well-known in the art, and is therefore not shown or described further herein. The tail end 20 also includes the drive mechanism for the conveyor (explained in detail below). While such drive motors are well known in the art and therefore not shown, it is helpful to point out the drive pulley 52, trans pulley 51 (for increasing the amount of conveyor belt 98 wrapped around the drive pulley 52 and thereby preventing the belt from slipping), and the pulley 54, at the lower-most end of the conveyor. The tail end 20 also includes a winch 56 (best shown in FIG. 8), whose function will be described in further detail below. The head end 44 of the main section 14 includes a pulley 58, structured so that a conveyor belt may be stretched between itself and the pulley 54, along the rollers 60 across the top surface of the main section 14. The head end 44 further includes a pair of pulleys 62, 64, located slightly forward of the pulley 58, and below a line defined between the pulleys 54, 58. A winch pulley 63 is located within the head end 44, in the present example on its bottom portion, for carrying the stinger extension cable 65 from the winch 56. Lastly, the head end 44 includes a transfer chute 66, best illustrated in FIG. 12.

The stinger 18 is slidably mounted within the main section 14, and is supported by the rollers 68 disposed on the bottom portion of the head end 44 of the main section 14, and the rollers 70 disposed on the upper portion of the starting end 72 of the stinger 18. The rollers 68 support the beam 74 of the stinger 18, while the rollers 70 bear against the beam 76 of the main section 14. The starting end 72 further includes a connection point 78 for the stinger extension cable 65 of the winch 56, and a second connection point 79 for the stinger retraction cable 67 of the winch 56 (FIG. 9). In the illustrated example, the cables 65,67 are different sections of the same cable (FIG. 8). Actuating the winch 56 to wind up the stinger extension cable 65 will therefore pull the starting end 72 of the stinger 18 towards the winch pulley 63, thereby causing the stinger 18 to be extended. Likewise, actuating the winch 56 in the opposite direction will cause the winch to wind up the stinger retraction cable 67, thereby retracting the stinger 18. The starting end 72 further includes a safety brake mechanism 80, best illustrated in FIGS. 9–11. The safety brake mechanism 80 includes a pair of catch bars 82 pivotally secured by the pivot rod 84 to the starting end 72. A rod 86 extends across the top of the catch rods 82. A cable interaction rod 87 connects the ends of the catch bars 82. The cable 65 passes under the rod 87, holding the safety brake 80 in its upper position of FIG. 10, so that if the cable 65 fails, the safety brake mechanism 80 will rotate downwards to the position of FIG. 11, at which point the downward rotation of the safety brake 80 is stopped by the rod 86 hitting the beam 74, so that the catch rods 82 catch on the cross beams 88 within the main section 14 (illustrated best in FIG. 4). The starting end 72 also includes a pulley 90, which will carry the conveyor belt as explained below. The terminal end 92 of the stinger 18 includes a pulley 94 for carrying a conveyor belt across the rollers 96, disposed across the top of the stinger 18.

In accordance with the invention, the conveyor belt 98 serves as the conveyor belt for both the main section 14 and the stinger 18. Although the path of the conveyor belt 98 is continuous, it is convenient to begin a description of its path with the drive pulley 52. From here, the conveyor belt 98 passes around the pulley 54, before passing across the rollers 60 to the pulley 58. After wrapping around the pulley 58, the conveyor belt passes around the pulley 64, and then across the rollers 96, across the top surface of the stinger 18. After wrapping around the pulley 94, the conveyor belt 98 extends towards the pulley 90, wrapping around this pulley, and then back towards the pulley 62. After wrapping around the pulley 62, the conveyor belt 98 extends around the trans pulley 51 and returns to the drive pulley 52. As can be seen in FIGS. 1–3, the conveyor belt 98 will remain in constant tension regardless of the position of the stinger 18. If the stinger is extended as in FIG. 3, the portion of the conveyor belt 98 between the pulleys 64, 94 will be long, while the portion of the conveyor belt between the pulleys 62, 90 will be short. Likewise, if the stinger 18 is retracted as in FIG. 1, the portion of the conveyor belt 98 between the pulleys 90, 62 will be long, while the portion of the conveyor belt 98 between the pulleys 64, 94 will be short. The conveyor belt 98 is therefore kept under constant tension, and may be operated within the stinger 18 in any position.

In use, the conveyor 10 will be transported to the job site by a truck 40. The hitch 26 will be detached from the hitch 42 of the truck, so that the conveyor 10 rests on the support 28. The arms 32, 34 will be moved from their position parallel to the conveyor 10 to their radial position, thereby permitting rotation of the conveyor 10 about the support 28 using the motor-driven chain drives. Once the conveyor 10 is in the desired position, the wheels 36 will be pinned in place to prevent further movement of the conveyor 10. The hydraulic cylinder 48 will be extended to raise the head end 44 of the main section to the desired height, and the winch 56 will be operated to extend the stinger 18 to the desired degree of extension. As the conveyor belt 98 is moved, material will be deposited on the conveyor belt 98 at the tail end 16 of the main section 14, where it will then be carried towards the head end 44 of the main section 14, deposited into the transfer chute 66, and then onto the conveyor belt 98 at the starting end 72 of the stinger 18, where it will be carried over the pulley 94 and into the desired stockpile of material.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:
1. A stacking telescoping conveyor, comprising:
   a base;
   a main frame having a tail end pivotally secured to the base, and a head end, the main frame including a first pulley disposed near the top of the tail end of the main frame, a second pulley disposed near the top of the head end of the main frame, and a third and fourth pulley disposed within the head end of the main frame, below a line defined connecting the first and second pulleys;

a stinger telescopically mounted within the main frame, the stinger having a first end and a terminal end, the stinger including a fifth pulley disposed at the stinger's first end, and a sixth pulley disposed at the stinger's terminal end; and a single conveyor belt extending across a top surface of the main frame and the stinger, the conveyor belt further extending around the first pulley, around the second pulley, around the fourth pulley, around the sixth pulley, around the fifth pulley, around the third pulley, and back to the first pulley, the conveyor having a single drive means.

2. The conveyor according to claim 1, further comprising a drive pulley.

3. The conveyor according to claim 2, further comprising a trans pulley adjacent to the drive pulley.

4. The conveyor according to claim 1, wherein the drive means of the conveyor is located in the tail end of the main frame.

5. The conveyor according to claim 1, further comprising:
a base having:
a tail end having a support, the base being structured to permit pivoting of the base about the support; and
a head end having a pair of pivotally secured arms, each arm terminating in a wheel, the arms being structured to pivot between a first position wherein they are substantially parallel to the base, and a second position wherein they are substantially in a radial position with respect to the base.

6. The conveyor according to claim 5, further comprising a drive mechanism structured to rotate the wheels.

7. The conveyor according to claim 5, further comprising a means for resisting rotation of the wheels.

8. The conveyor according to claim 5, further comprising a lifting mechanism structured to move the main frame between a lowered position wherein the main frame is substantially horizontal, and an elevated position wherein the head end is elevated with respect to the tail end.

9. The conveyor according to claim 1, further comprising a winch disposed in the tail end of the main frame, the winch having an extension cable extending to the head end of the main frame, around a pulley, and then to the first end of the stinger, and a retraction cable extending from the winch to the first end of the stinger.

10. The conveyor according to claim 9, further comprising a safety brake, the brake having at least one arm pivotally secured to the stinger, a cable-engaging crosspiece structured to rest atop the extension cable of the winch, and a stinger-engaging crosspiece structured to permit pivoting of the arm downward under gravity a sufficient distance to catch a crossbeam of the main frame, and to resist substantial further pivoting of the arm, whereby breakage of the extension cable permits the arm to fall into position to catch the crossbeam.

11. The conveyor according to claim 5, further comprising a hitch structured for securing to a hitch of a truck and disposed at the tail end of the base.

12. A portable radial stacker having a main section and a stinger telescopically mounted to the main frame, the improvement comprising a single belt and a single drive means for both the main frame and the stinger, wherein:

the main frame includes a tail end and a head end, the main frame further includes a first pulley disposed near the top of the tail end of the main frame, a second pulley disposed near the top of the head end of the main frame, and a third and fourth pulley disposed within the head end of the main frame, below a line defined connecting the first and second pulleys;

the stinger includes a first end and a terminal end, the stinger further includes a fifth pulley disposed at the stinger's first end, and a sixth pulley disposed at the stinger's terminal end; and the conveyor belt extends around the first pulley, around the second pulley, around the fourth pulley, around the sixth pulley, around the fifth pulley, around the third pulley, and back to the first pulley.

13. The conveyor according to claim 12, further comprising a drive pulley.

14. The conveyor according to claim 13, further comprising a trans pulley adjacent to the drive pulley.

15. The conveyor according to claim 12, wherein the drive means of the conveyor is located in the tail end of the main frame.

16. A method of running a conveyor belt across a telescoping stacking conveyor, the conveyor comprising a main section having a tail end and a head end, and a stinger section telescopically mounted within the main section, the stinger section having a first end and a terminal end, the method comprising:

providing a first pulley disposed near the top of the tail end of the main section, a second pulley disposed near the top of the head end of the main section, and a third and fourth pulley disposed within the head end of the main section, below a line defined connecting the first and second pulleys;

providing a fifth pulley disposed at the stinger's first end, and a sixth pulley disposed at the stinger's terminal end;

running a conveyor belt around the first pulley, around the second pulley, around the fourth pulley, around the sixth pulley, around the fifth pulley, around the third pulley, and back to the first pulley; and providing a single drive means for the conveyor, the drive means rotating a pulley around which the conveyor belt extends.

17. The method according to claim 16, further comprising running the conveyor around a drive pulley in addition to the first, second, third, fourth, fifth, and sixth pulleys, and operatively connecting the drive means to the drive pulley.

18. The method according to claim 17, further comprising providing a trans pulley adjacent to the drive pulley, and running the conveyor around the trans pulley.

* * * * *